(12) United States Patent
Tsuji et al.

(10) Patent No.: US 7,288,221 B2
(45) Date of Patent: Oct. 30, 2007

(54) MOLD CLAMPING APPARATUS, MOLDING MACHINE AND MOLD CLAMPING METHOD

(75) Inventors: Makoto Tsuji, Kanagawa (JP); Hiroshi Yokoyama, Kanagawa (JP); Shinya Itani, Kanagawa (JP)

(73) Assignee: Toshiba Kakai Kabushiki Kaisha, Tokyo (JP)

( * ) Notice: Subject to any disclaimer, the term of this patent is extended or adjusted under 35 U.S.C. 154(b) by 296 days.

(21) Appl. No.: 11/087,771

(22) Filed: Mar. 24, 2005

(65) Prior Publication Data
US 2005/0226957 A1   Oct. 13, 2005

(30) Foreign Application Priority Data
Apr. 13, 2004   (JP) ............................. 2004-117967

(51) Int. Cl.
B29C 45/80   (2006.01)
B22D 17/26   (2006.01)

(52) U.S. Cl. .................. 264/40.5; 164/137; 164/154.2; 164/341; 164/342; 164/457; 425/150; 425/595

(58) Field of Classification Search ............. 425/150, 425/190, 589, 595; 264/40.5; 164/137, 164/154.2, 303, 341, 342, 457
See application file for complete search history.

(56) References Cited

U.S. PATENT DOCUMENTS 5,753,153 A * 5/1998 Choi ..................... 264/40.5
5,863,474 A * 1/1999 Ito et al. ................ 264/40.5
6,821,104 B2 * 11/2004 Kubota et al. ............ 425/150

FOREIGN PATENT DOCUMENTS

| JP | 08-276482 A | 10/1996 |
| JP | 10-296739 A | 11/1998 |
| JP | 2003-181894 | * 7/2003 |

* cited by examiner

*Primary Examiner*—James Mackey
(74) *Attorney, Agent, or Firm*—Pillsbury Winthrop Shaw Pittman, LLP

(57) ABSTRACT

To provide a mold clamping apparatus that a new actuator is not necessary for a mold thickness adjustment and that the mold thickness adjustment can be performed at low cost. A mold clamping apparatus has a tie bar having a piston and a coupled groove, a cylinder for mold clamping that has the piston of the tie bar built in and that pressured driving liquid for generating mold clamping force is supplied, a half nut coupled with the tie bar releasably by meshing with the coupled groove, a position sensor detecting a position of a moving direction of the tie bar, a direction change valve changing a supply of the driving liquid between a first cylinder chamber and a second cylinder chamber, and a control apparatus positioning a position of the tie bar at a position that the half nut and the coupled groove are able to be meshed by controlling the direction change valve in response to the position of the tie bar detected by the position sensor.

7 Claims, 6 Drawing Sheets

MOLD CLAMPING APPARATUS, MOLDING MACHINE AND MOLD CLAMPING METHOD

CROSS REFERENCE TO RELATED APPLICATIONS

This application claims the benefit of priority of Japanese Patent Application No. 2004-117967, filed in Japan on Apr. 13, 2004, the entire contents of which are incorporated herein by reference.

BACKGROUND OF THE INVENTION

1. Field of the Invention

The present invention relates to a mold clamping apparatus for a molding machine, a molding machine and a mold clamping method.

2. Description of the Related Art

A mold clamping apparatus of a molding machine such as a die casting machine is used to clamp a die with necessary mold clamping force for suppressing opening of the die by pressure in the die when a molten metal is injected and filled into the die. As such a mold clamping apparatus, a so-called composite type mold clamping apparatus performing an opening or closing movement of the dies and clamping the dies by using an independent actuator is known (for example, refer to Kokai (Japanese unexamined patent publication) No. H10(1998)-296739 and Kokai (Japanese unexamined patent publication) No. H8(1996)-276482).

In the compound type mold clamping apparatus, for example, a half nut is provided in a die plate holding a die and a coupled section able to mesh with the half nut is provided in a tie bar, after the coupled section of the tie bar and the half nut are meshed in a state where the dies are clamped, mold clamping force is given to the tie bar.

When changing to a new die having a different thickness to that of the old die, a positional relationship of the half nut and the coupled section of the tie bar in mold clamping changes. When a positional relationship of the half nut and the coupled section of the tie bar is changed, the half nut and the coupled section of the tie bar have possible to not be meshed, and a positional relationship of the half nut and the coupled section of the tie bar is necessary to be adjusted to a positional relationship able to be meshed. Namely, a so-called mold thickness adjustment for adjusting a positional relationship of the half nut and the coupled section of the tie bar in concert with a thickness of the die is necessary to be performed.

Meanwhile, for performing the mold thickness adjustment, a position of either of the half nut and the tie bar is necessary to be changed, and an actuator for changing a position of them becomes necessary.

However, if an actuator used only for performing the mold thickness adjustment is provided in the mold clamping apparatus, it suffers from a disadvantage that an apparatus constitution becomes complex and an apparatus cost rises.

SUMMARY OF THE INVENTION

An object of the invention is to provide a mold clamping apparatus of which structure is simple and cost is reduced, a molding machine using the same, and a mold clamping method.

The mold clamping apparatus of the present invention is a mold clamping apparatus for clamping a fixed die and a movable die on a base and has a fixed die plate fixed on the base and holding the fixed die, a movable die plate holding the movable die and provided in the opening or closing direction on the base movably, a tie bar having a piston and a coupled section, a cylinder for mold clamping equipped in either of the fixed die plate or the movable die plate, having a cylinder chamber accommodating the piston of the tie bar and at least two driving liquid supply ports supplying pressurized driving liquid for generating mold clamping force to the cylinder chamber, a coupling section being equipped in the other of the fixed die plate or the movable die plate and enabling to couple or release for the coupled section of the tie bar, a position detector for detecting a position of the tie bar in a moving direction of the tie bar, a direction change valve coupled with each of the driving liquid supply ports for changing a supply of the driving liquid between a first cylinder chamber and a second cylinder chamber zoned by the piston of the cylinder for mold clamping, and a control unit for controlling a position of the tie bar in a position that the coupling section and the coupled section of the tie bar are able to be coupled by controlling the direction change valve in response to a position of the tie bar detected by the position detector in a state that the movable die and the fixed die are contacted.

Preferably, the position detector detects a position of a portion of a side that the piston is positioned in a side that the piston of the tie bar is positioned and a side that the coupled section is positioned, and an end side seen from the piston for the either of the fixed die plate or the movable die plate.

Preferable, the mold clamping apparatus has a die plate position detection sensor for detecting a position of the movable die plate on the base further, the control unit decides a position of the tie bar that the coupling section and the coupled section are able to be coupled based on a detected value of the die plate position detection sensor.

Preferably, the control unit decides a position of the tie bar able to assure a moving stroke of the piston as a first target position, decides the nearest position to the first target position in a plurality of positions that the coupling section and the coupled portion are able to be coupled as a second target position, and positions a position of the tie bar as the second target position.

Preferably, the coupled section includes a plurality of grooves arranged along an axis direction of the tie bar, the coupling section includes a projection, and the coupled section and the coupling section are coupled by meshing any of a plurality of the grooves and the projection.

Preferably, the coupled section has a half nut.

Preferably, a molding machine of the present invention is a molding machine for producing a cast product by injecting and filling a molding material to a cavity formed by mold clamping of a fixed die and a movable die, wherein a mold clamping apparatus has a fixed die plate being fixed on a base and holding the fixed die, a movable die plate holding the movable die and provided in the opening or closing direction on the base movably, a tie bar having a piston and a coupled section, a cylinder for mold clamping being equipped in either of the fixed die plate or the movable die plate and having a cylinder chamber accommodating the piston of the tie bar and at least two driving liquid supply ports supplying pressurized driving liquid for generating mold clamping force to the cylinder chamber, a coupling section being equipped in the other of the fixed die plate or the movable die plate and enabling to unite or release for the combined section of the tie bar, a position detector for detecting a position of the tie bar in a moving direction of the tie bar, a direction change valve coupled to each of the driving liquid supply ports for change a supply destination of the driving liquid between a first cylinder chamber and a second cylinder chamber zoned by the piston of the cylinder for mold clamping, a control unit for controlling a position of the tie bar in a position that the coupling section and the coupled section of the tie bar are able to be coupled by controlling the direction change valve with referring a position of the tie bar detected by the position detector in a state that the movable die and the fixed die are contacted, a sleeve coupled with the cavity, a plunger tip inserted to the sleeve, and an injection cylinder driving the plunger tip.

A mold clamping method of the present invention is a mold clamping method clamping a fixed die and a movable die on a base and providing a fixed die plate being fixed on the base and holding the fixed die, a movable die plate holding the movable die and provided in the opening or closing direction on the base movably, a tie bar having a piston and a coupled section, a cylinder for mold clamping being equipped in either of the fixed die plate or the movable die plate, having a cylinder chamber accommodating the piston of the tie bar and at least two driving liquid supply ports supplying pressurized driving liquid for generating mold clamping force to the cylinder chamber, a coupling section being equipped in the other of the fixed die plate or the movable die plate and enabling to unite or release for the coupled section of the tie bar, wherein the tie bar is moved by a supply of driving liquid to the cylinder for mold clamping and a position of the tie bar is positioned at a position that the coupling section and the coupled section of the tie bar are able to be coupled in a state that the movable die and the fixed die are contacted and the coupled section and the coupling section are released, the coupled section of the positioned tie bar and the coupling section are coupled, and mold clamping force is generated by a supply of the driving liquid to the cylinder for mold clamping in a state that the coupled section and the coupling section are coupled.

BRIEF DESCRIPTION OF THE DRAWINGS

These and other objects and features of the present invention will become more clearer from the following description of the preferred embodiments given with reference to the accompanying drawings, in which.

DESCRIPTION OF THE PREFERRED EMBODIMENTS

Preferred embodiments of the present invention will be described with reference to the accompanying drawings.

Figure 1:
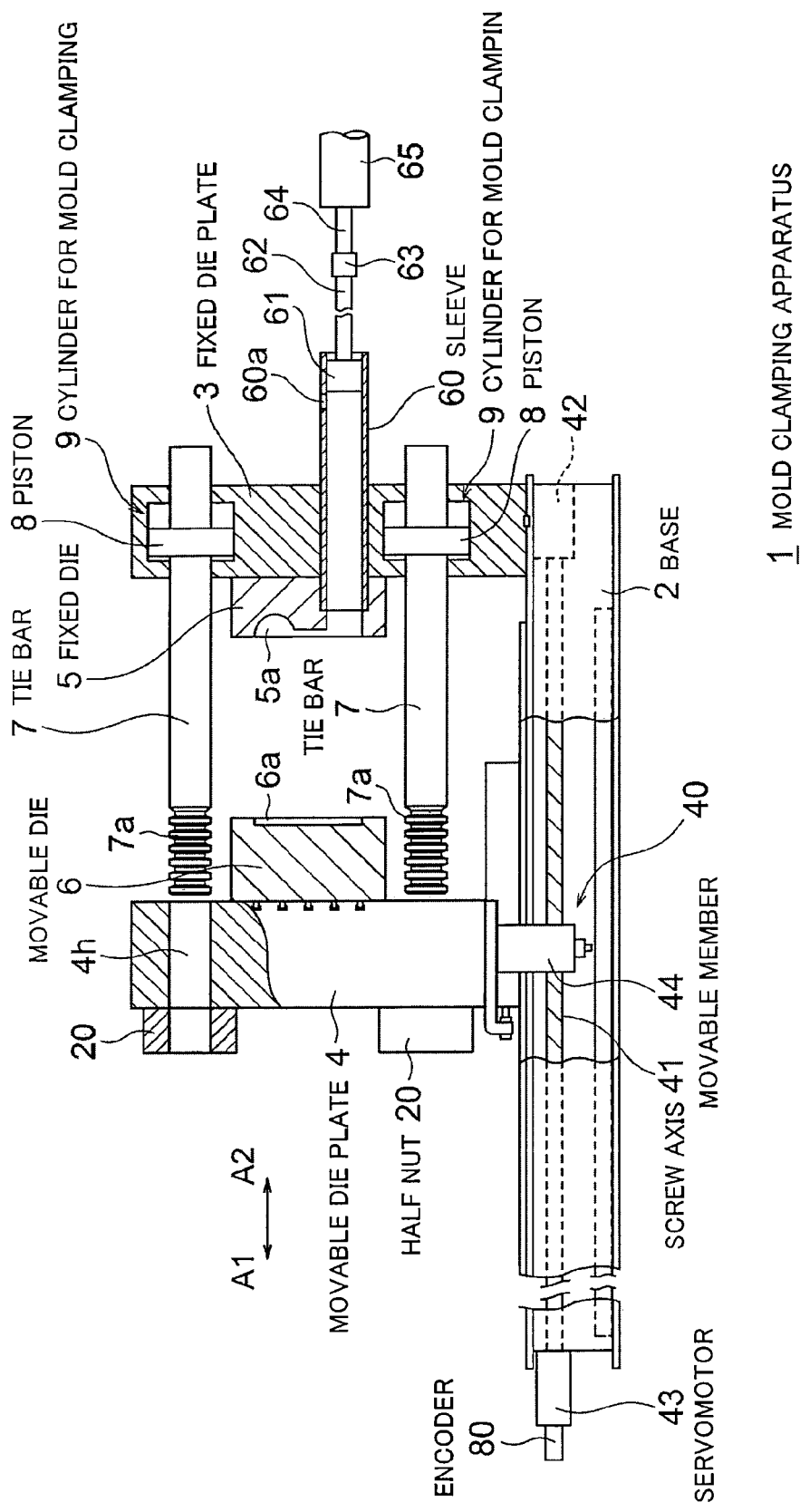
FIG. 1 is a front view partly including a sectional view showing a constitution of a mechanical portion of a mold clamping apparatus according to a first embodiment of the present invention.
Figure 2:
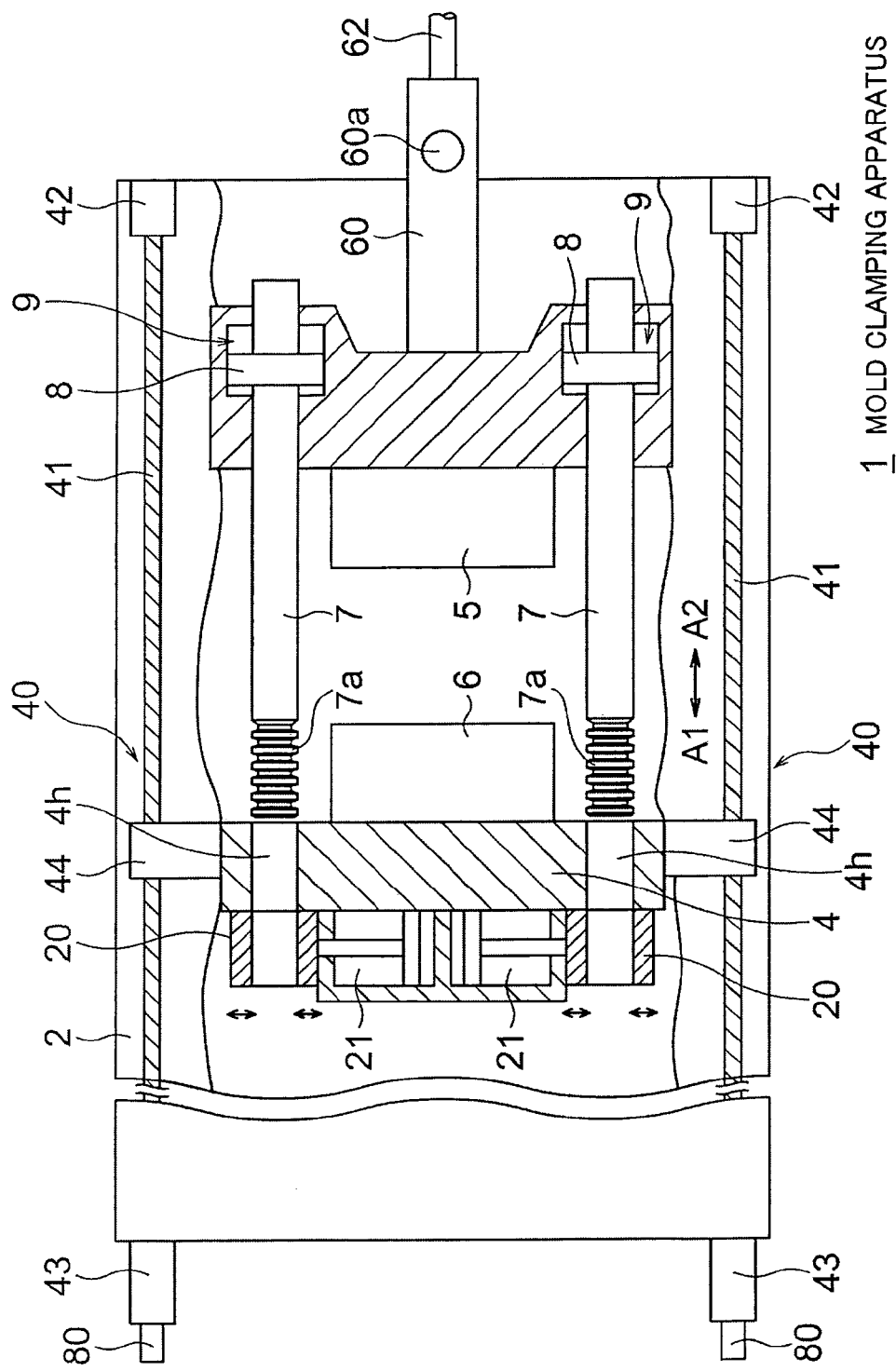
FIG. 2 is a view that the mold clamping apparatus shown in FIG. 1 is seen from the upper side.

FIG. 1 is a front view partly including a sectional view showing a constitution of a mechanical portion of a mold clamping apparatus according to a first embodiment of the present invention. Further, FIG. 2 is a view that the mold clamping apparatus shown in FIG. 1 is seen from the upper side.

Note that, a mold clamping apparatus according to the present embodiment is applied to, for example, a die casting machine.

A mold clamping apparatus 1 has a fixed die plate 3, a movable die plate 4, a tie bar 7, a cylinder for mold clamping 9, a movement mechanism 40 and a half nut 20.

Note that, the half nut 20 is an embodiment of a coupling section of the present invention.

The fixed die plate 3 is fixed on a base 2. The fixed die plate 3 holds a fixed die 5 in a foreside.

The movable die plate 4 holds a movable die 6 in a foreside (a side opposite to the fixed die plate 3). This movable die plate 4 is movably provided in an opening direction A1 and a clamping direction A2 on the base 2. In the movable die plate 4, a through-hole 4h into which the tie bar 7 is inserted is formed. This through-hole 4h is formed, for example, in four corners of the movable die plate 4.

By clamping pair of dies of the fixed die 5 and the movable die 6, a cavity is defined between a recess 5a of the fixed die 5 and a recess 6a of the movable die 6.

In a backside of the fixed die plate 3, a sleeve 60 is provided. A plunger tip 61 is fitted in the sleeve 60, and a plunger rod 62 is coupled with a piston rod 64 of an injection cylinder 65 via a coupling 63, where the plunger tip 61 is coupled to a tip of the plunger rod 62.

The injection cylinder 65 is driven by pressurized oil and it elongates and contracts to the piston rod 64.

By advancing the piston rod 64 in a condition that a molten metal ML is supplied to the sleeve 60 through a supply port 60a, the molten metal ML as an example of a molding material is injected and filled to the cavity C defined between the clamped fixed die 5 and the movable die 6.

The tie bar 7 is supported horizontally by the fixed die plate 3.

In a free end of the movable die plate 4 side of the tie bar 7, for example, a sawtooth shaped coupled groove 7a is formed. Note that, the coupled groove 7a is an embodiment of a coupled section of the present invention.

In a middle of the tie bar 7, a piston 8 built in the cylinder for mold clamping 9 is provided.

The cylinder for mold clamping 9 is positioned inside of the fixed die plate 3, and the piston 8 is built in this fixed die plate 3 movably. By supplying high-pressurized driving oil to a cylinder chamber of the cylinder for mold clamping 9, force is act between the fixed die plate 3 and the tie bar 7 and the tie bar 7 is driven for the fixed die plate 3.

The tie bar 7 is movable for the fixed die plate 3 in a range of movement of the piston 8 coupled with the tie bar 7, namely, in a range of a stroke of the cylinder for mold clamping 9.

The movement mechanism 40 is built inside the base 2 and it has a screw axis 41, a supporting member 42, a servomotor 43 and a movable member 44.

The supporting member 42 supports an end of the screw axis 41 rotatably.

The other end of the screw axis 41 is coupled with the servomotor 43.

The screw axis 41 is screwed in the movable member 44.

The movable member 44 is fixed in a both side of the movable die plate 4 as shown in FIG. 2.

In this movement mechanism 40, by performing the servomotor 43 rotation control, the screw axis 41 is rotated and this rotation of the screw axis 41 is transformed to a rectilinear motion of the movable member 44. As a result, the movable die plate 4 is driven in the opening direction A1 or the clamping direction A2.

By detecting a position of the movable member 44 by an encoder 80 of the servomotor 43, a position of the movable die plate 4 is determined, and a position of the half nut 20 is decided from the position of the movable die plate 4. Note that, the encoder 80 is an example of a die plate detection sensor.

The half nut 20 is arranged behind the through-hole 4$h$ of the movable die plate 4. In this half nut 20, a projection 20$a$ meshing with the coupled groove 7$a$ of the tie bar 7 (refer to FIG. 3 and FIG. 6A) is formed. Note that, it can be treated as grooves meshing with a plurality of projection portions (projected rims) between the coupled grooves 7$a$ of the tie bar 7 in the half nut 20.

The half nut 20 is opened or closed by a half nut opening or closing cylinder 21. When the half nut 20 is closed and meshed (coupled) with the coupled groove 7$a$ of the tie bar 7, the tie bar 7 and the movable die plate 4 are coupled. When the half nut 20 is opened, a coupling with the tie bar 7 and the movable die plate 4 is released.

Figure 3:
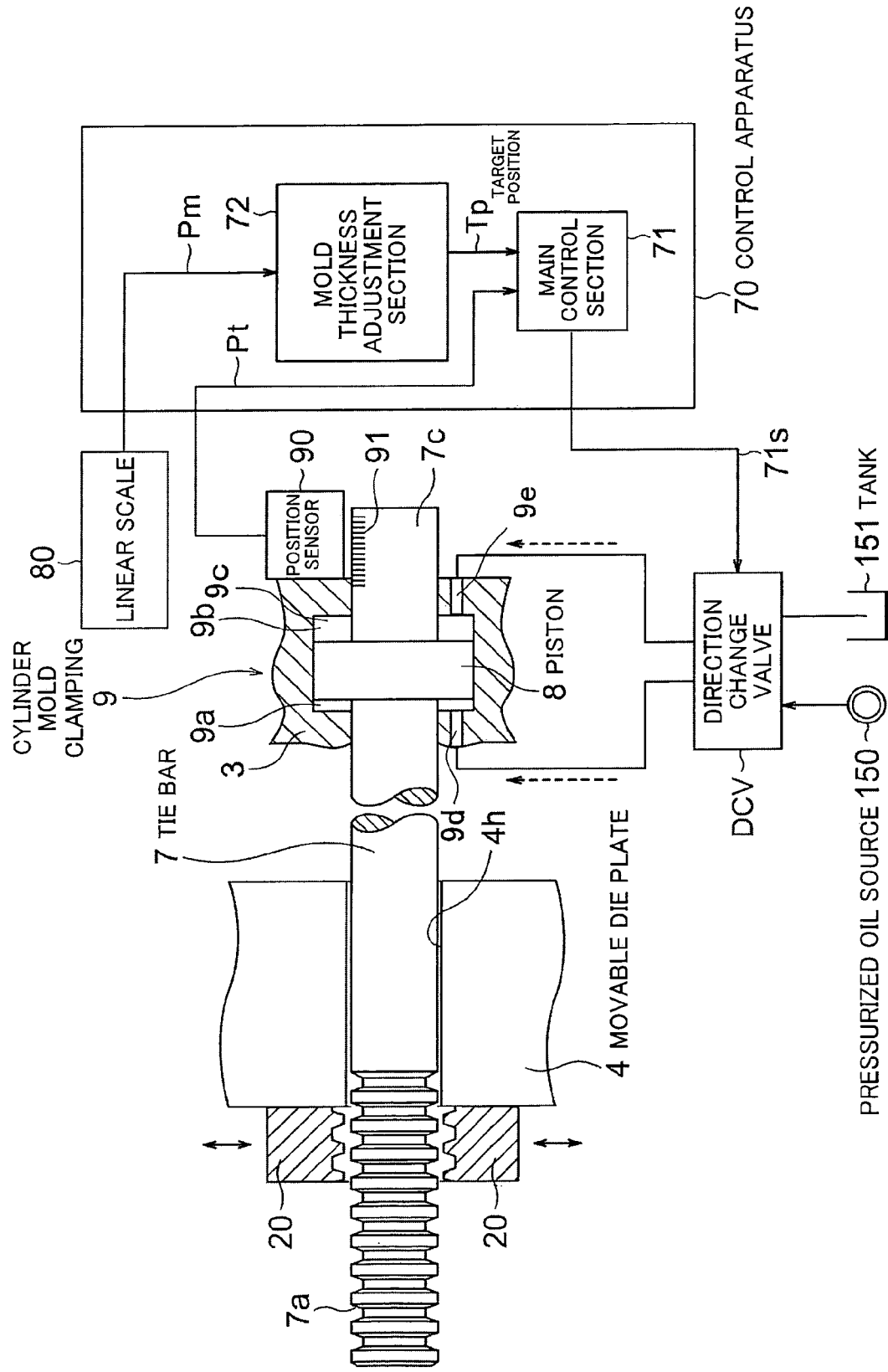
FIG. 3 is a view showing a constitution of a cylinder for mold clamping, the vicinity of a half nut and a coupled groove of a tie bar and a control apparatus.

FIG. 3 shows a structure in the vicinity of the cylinder for mold clamping 9 of the mold clamping apparatus 1 and in the vicinity of the half nut 20 and the coupled groove 7$a$ of the tie bar 7, and a constitution of a control apparatus 70.

As shown in FIG. 3, a cylinder chamber 9$c$ of the cylinder for mold clamping 9 is zoned divided to cylinder chambers 9$a$ and 9$b$ by the piston 8 and a direction change valve DCV is coupled to the cylinder chambers 9$a$ and 9$b$ through pipelines and supply ports 9$c$ and 9$d$.

The direction change valve DCV enables the supply of high-pressurized driving oil supplied from the pressurized oil source 150 to either of the cylinder chambers 9$a$ and 9$b$ of the cylinder for mold clamping 9 in response to a control command 71$s$ from the control apparatus 70.

Concretely, the direction change valve DCV enables to supply of the driving oil to the cylinder chamber 9$a$ in mold clamping, and the supply of the driving oil by changing the cylinder chamber 9$a$ or 9$b$ of the cylinder for mold clamping 9 in a mold thickness adjustment, and changes a position of the piston 8 (tie bar 7) to mesh the coupled groove 7$a$ of the tie bar 7 and the half nut 20.

Note that, the direction change valve DCV makes to flow the driving oil from the pressurized oil source 150 toward a tank 151 when the piston 8 is not driven.

The pressurized oil source 150 supplies the driving oil which is boosted to a pressure necessary for mold clamping to the direction change valve DCV.

As shown in FIG. 3, a scale 91 is arranged in a posterior end portion 7$c$ of the tie bar 7 and a position sensor 90 is provided at a position opposite to this scale 91.

The position sensor 90 detects a position Pt of the tie bar 7 and outputs it to the control apparatus 70. As the position sensor 90, for example, a thing performing position detection optically or magnetically can be used.

The control apparatus 70 has a main control section 71 and a mold thickness adjustment section 72. Preferably, a function of the control apparatus 70 is performed by hardware such as a signal processing apparatus (processor) of a computer and so on and necessary software. However, the main control section 71 and the mold thickness adjustment section 72 can be constituted by using circuits respectively.

The mold thickness adjustment section 72 obtains a position Pm of the movable die plate 4 detected by the encoder 80 of the servomotor 43, decides a target (reference) position Tp for positioning the coupled groove 7$a$ of the tie bar 7 at a position able to mesh with the half nut 20 based on this information and outputs it to the main control section 71.

The main control section 71 performs various processing for control the mold clamping apparatus 1 comprehensively. The main control section 71 receives the target position Tp from the mold thickness adjustment section 72, generates the control command 71$s$ for positioning the tie bar 71 at this target position Tp with referring the position Pt of the tie bar 7 detected by the position sensor 90 and outputs it to the direction change valve DCV.

Further, the main control section 71 outputs the control command 71$s$ making to supply the driving oil to the cylinder chamber 9$a$ of the cylinder for mold clamping 9 to the direction change valve DCV in mold clamping.

Next, it will be explained about an example of an action of the mold clamping apparatus 1.

The mold clamping apparatus 1 in a state shown in FIG. 1 and FIG. 2 is in a state that the movable die plate 4 is moved in a predetermined opening position. In this state, the piston 8 is positioned as a predetermined position in the cylinder for mold clamping 9.

From this state, by driving the servomotor 43, the movable die plate 4 is moved to the clamping direction A2. The movement speed of the movable die plate 4 is decided at high speed from the viewpoint of reduction of cycle time.

Figure 4:
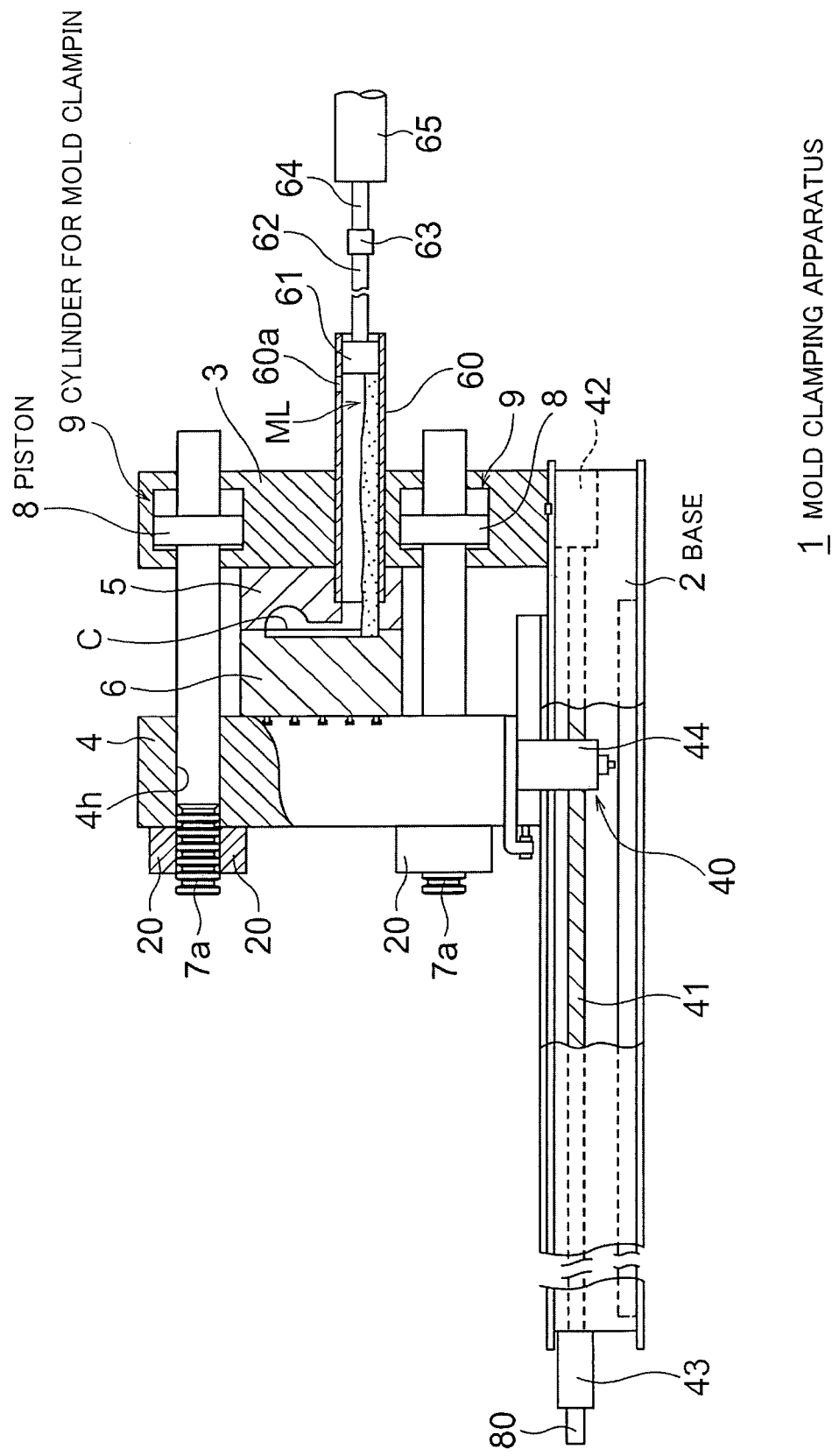
FIG. 4 is a view showing a state of a mold clamping apparatus when adjusting a mold thickness.

Then, the movable die plate 4 is moved to the clamping direction A2, slowed down at a position just before the fixed die 5 and the movable die 6 are contacted and the fixed die 5 and the movable die 6 are contacted at a low speed as shown in FIG. 4.

As a result, mold closing of the fixed die 5 and the movable die 6 is finished.

The mold thickness adjustment is performed in this state and an introduction of the molten metal ML to the sleeve 60 is started.

In a state that the fixed die 5 and the movable die 6 are contacted, the coupled groove 7$a$ of the tie bar 7 penetrates the through-hole formed in the movable die plate 4, and is in a position opposite to the half nut 20 in a released state.

Figure 5:
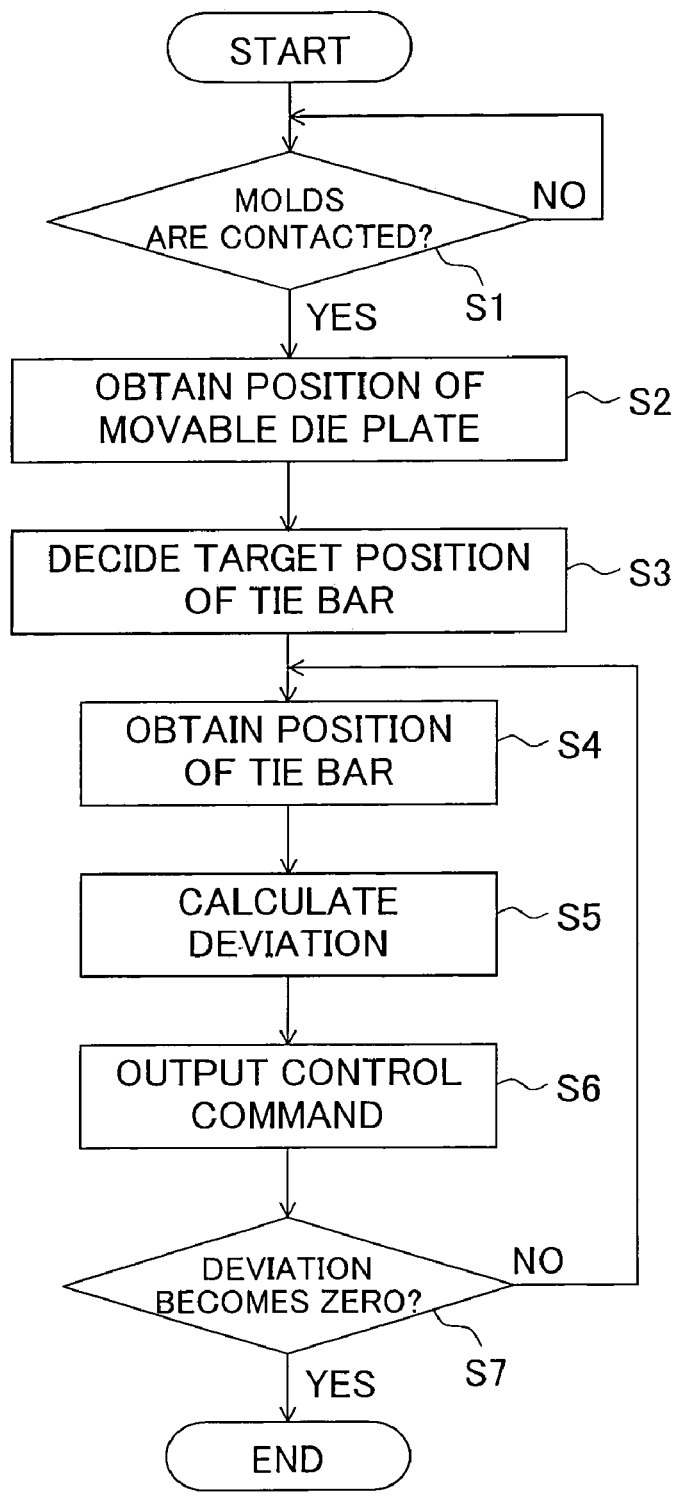
FIG. 5 is a flow chart showing an example of processing in a control apparatus when adjusting a mold thickness.

It will be explained about an example of processing for the thickness adjustment in the control apparatus 70 by referring to flow chart shown in FIG. 5.

The control apparatus 70 judges whether or not the fixed die 5 and the movable die 6 are contacted (step S1), obtains the position Pm of the movable die plate 4 through the encoder 80 of the servomotor 43 when judging that they are contacted (step S2).

The control apparatus 70 obtains a position of the half nut 20 based on the obtained position Pm of the movable die plate 4.

Since the control apparatus 70 can obtain mounting position information of the half nut 20 for the movable die plate 4 and size information of the half nut 20 in advance, a relative position to a reference position of the half nut 20 can be decided correctly from the position Pm of the movable die plate 4 by using the above information.

In the control apparatus 70, after deciding the position of the half nut 20, the target position Tp in which the tie bar 7 should be positioned is decided (step S3).

A decision of the target position Tp is performed as the followings. First, a target position Tpa that a necessary stroke for the piston 8 of the tie bar 7 is assured in the cylinder for mold clamping 9 when performing mold clamping is decided. Namely, since the pressurized driving oil is supplied to either cylinder chamber 9a of the cylinder for mold clamping 9 and the piston 8 is moved to the other cylinder chamber 9b side in mold clamping, it is necessary to assure this distance. Note that, the target position Tpa is an example of a first target position.

Figure 6A:
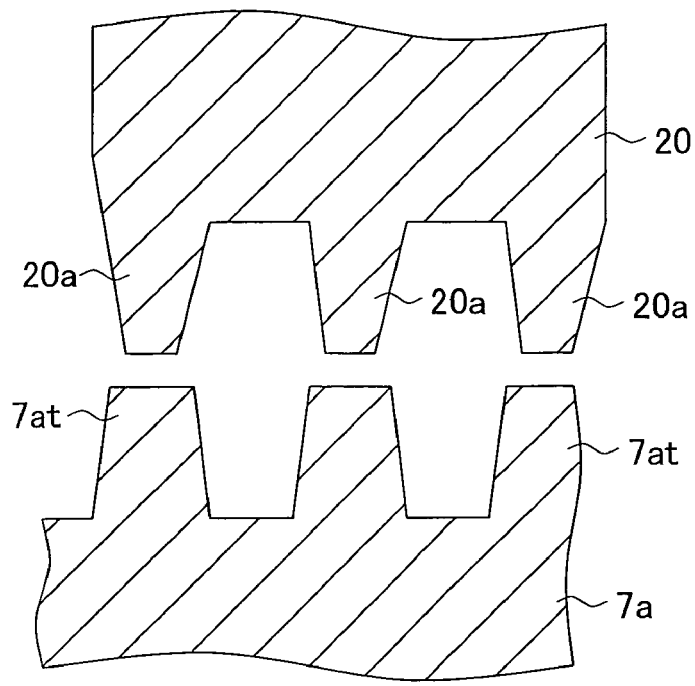
FIGS. 6A and 6B are views showing a relationship unable to mesh a half nut and a coupled groove of a tie bar and a relationship able to mesh a half nut and a tie bar.

Even if the tie bar 7 is positioned in this target position Tpa, for example, as shown in FIG. 6A, the projection 20a of the half nut 20 and the coupled groove portion 7a of the tie bar 7 is opposite mutually and there is a possibility that the coupled groove portion 7a of the tie bar 7 and the half nut 20 cannot be meshed.

Therefore, a moving distance ΔTp from the target position Tpa to the nearest position that the coupled groove 7a of the tie bar 7 can mesh with the half nut 20 is calculated.

Note that, since the control apparatus 70 can obtain the size information of the coupled groove 7a of the tie bar 7 and the half nut 20 in advance, the moving distance ΔTp from the target position Tpa to the nearest position that the coupled groove 7a of the tie bar 7 can mesh with the half nut 20 can be calculated correctly.

Then, the final target position Tp is defined by adding the moving distance ΔTp to the target position Tpa. Note that, the target position Tp is an example of a second target position.

Next, the main control section 71 of the control apparatus 70 obtains the position Pt of the tie bar 7 from the position sensor 9 (step S4).

Next, a deviation (difference) of the obtained current position Pt of the tie bar 7 and the decided target position Tp is calculated (step S5), the control command 71s for controlling the direction change valve DCV is generated based on this deviation and outputted the same (step S6).

The control apparatus 70 judges whether the above deviation disappears or not (step S7). While the deviation is remained, the control apparatus 70 performs the processing of the steps S4 to S6 repeatedly, when the deviation has disappeared, the positioning of the tie bar 7 is finished and the mold thickness adjustment is ended.

Figure 6B:
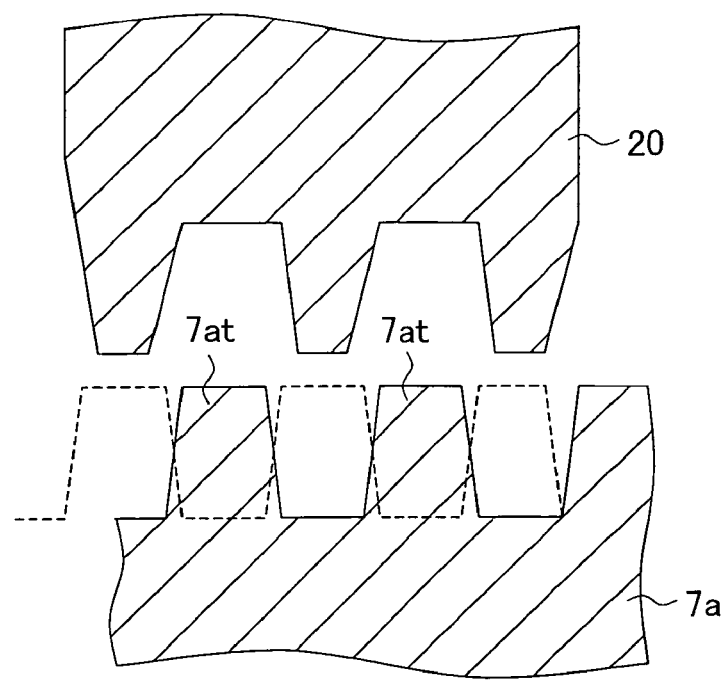

When the tie bar 7 is positioned in the target position Tp, as shown in FIG. 6B, the coupled groove 7a of the tie bar 7 and the half nut 20 can be meshed.

In this state, when closing the half nut 20, the coupled groove 7a of the tie bar 7 and the half nut 20 are coupled and the mold thickness adjustment is finished.

After the mold thickness adjustment has been finished, the pressured driving oil is supplied to either cylinder chamber 9a of the cylinder for mold clamping 9 from the pressurized oil source 150 through the direction change valve DCV, and mold clamping is performed.

Since an introduction of the molten metal ML to the sleeve 60 is performed while the above mold thickness adjustment process and the mold clamping process are performed, when the introduction of the molten metal ML to the sleeve 60 is finished, the molten metal ML is injected and filled to the cavity C defined between the clamped fixed die 5 and movable die 6, and a mold product is produced.

Note that, in the present embodiment, the above mold thickness adjustment is performed for every casting cycles regardless of whether or not the fixed die 5 and the movable die 6 are replaced. It is because the tie bar 7 is movable and the mold clamping apparatus 1 of the present embodiment does not have means for positioning the tie bar 7 at a constant position mechanically. However, in the present embodiment, even if the mold thickness adjustment is performed for every casting cycles, the mold thickness adjustment is performed in parallel with the introduction of the molten metal ML to the sleeve 60, since the casting cycle does not extend.

As mentioned above, according to the present embodiment, since the positioning of the tie bar 7 is performed by using the cylinder for mold clamping 9, a new actuator is not necessary for the mold thickness adjustment and the mold clamping apparatus 1 able to adjust the mold thickness at low cost can be obtained.

The present invention is not limited to the above-mentioned embodiment.

The present invention may be applied to various molding machines injecting and filling a molding material to a cavity with clamping a die, and the present invention is not limited to the die casting machine.

The molding machine of the present invention includes a metal molding machine, a plastic injection molding machine and a molding machine of wood flour and so on. The molding machine of wood flour and so on includes, for example, a machine molding with a material mixed a thermoplastic resin with the wood flour.

It was explained about a case that the position sensor 90 is positioned in the posterior end portion of the tie bar 7 in the above-mentioned embodiment, the position sensor 90 may be positioned in the other position. However, the distance by the piston 8 and the cylinder 9 can be measured by detecting a relative position of the posterior end portion of the tie bar 7 of the fixed die plate 3 side and the fixed die plate 3 (base 2) despite elongation of the tie bar 7. About a position detector, a detector provided in the tie bar and detecting a relative position for the fixed die plate (base) is acceptable, and a detector provided in the fixed die plate, base and so on and detecting a relative position of the tie bar is also acceptable.

The coupling section and the coupled section may have to regulate move of an axis direction of the tie bar for the fixed die plate and the movable die plate, and the coupling section and the coupled section are not limited to the groove provided in the half nut and the tie bar. For example, a hole portion perpendicular to the axis direction of the tie bar may be provided in the tie bar and the tie bar may be fixed for the die plate by inserting the bolt in the hole portion.

Further, in the above-mentioned embodiment, it was explained about a case that the cylinder for mold clamping 9 is provided in the fixed die plate 3 and the half nut 20 is provided in the movable die plate 4, however, a constitution that the cylinder for mold clamping 9 is provided in the movable die plate 4 and the half nut 20 is provided in the fixed die plate 3 may be acceptable.

The tie bar may be one or more. Preferably, mold clamping force given to a die is divided between a piston and a coupled section by three or more tie bars, and force acting to a mating face is made uniform.

What is claimed is:

1. A mold clamping apparatus for clamping a fixed die and a movable die on a base, comprising:
   a fixed die plate fixed on the base and holding the fixed die;
   a movable die plate holding the movable die and provided in the opening or closing direction on the base movably;
   a tie bar having a piston and a coupled section;
   a cylinder for mold clamping equipped in either of the fixed die plate or the movable die plate, having a cylinder chamber accommodating the piston of the tie bar and at least two driving liquid supply ports supplying pressurized driving liquid for generating mold clamping force to the cylinder chamber;

a coupling section being equipped in the other of the fixed die plate or the movable die plate and enabling to unite or release for the coupled section of the tie bar;

a die plate position detection sensor for detecting a position of the movable die plate on the base:

a position detector for detecting a position of the tie bar in a moving direction of the tie bar;

a direction change valve coupled with each of the driving liquid supply ports for changing a supply of the driving liquid between a first cylinder chamber and a second cylinder chamber zoned by the piston of the cylinder for mold clamping, and a control unit for specifying a position of the tie bar where the coupling section and the coupled section are to be coupled based on the position of the movable die plate detected by the die plate position detection sensor, and controlling the tie bar at the specified position by controlling the direction change valve in response to the position of the tie bar detected by the position detector in a state where the movable die and the fixed die are contacted and a molding material is provided to a sleeve coupled with a cavity formed by the fixed die and the movable die, wherein said specifying a position of the tie bar and said controlling the tie bar at the specified position is performed for every molding cycle.

2. A mold clamping apparatus as set forth in claim 1, wherein the position detector detects a position of an end of the tie bar in the piston side for either of the fixed die plate or the movable die plate.

3. A mold clamping apparatus as set forth in claim 1, wherein the control unit specifies a position of the tie bar able to assure a moving stroke of the piston as a first target position;

specifies the nearest position to the first target position in a plurality of positions where the coupling section and the coupled portion are able to be coupled as a second target position based on the first target position and a position of a movable die plate detected by the die plate position detection sensor, and positions a position of the tie bar at the second target position.

4. A mold clamping apparatus as set forth in claim 1, wherein the coupled section includes a plurality of grooves arranged along an axis direction of the tie bar;

the coupling section includes a projection, and the coupled section and the coupling section are coupled by meshing any of a plurality of the grooves and the projection.

5. A mold clamping apparatus as set forth in claim 4, wherein the coupling section comprises a half nut.

6. A molding machine for producing a cast product by injecting and filling a molding material to a cavity formed by mold clamping of a fixed die and a movable die, wherein a mold clamping apparatus comprises:

a fixed die plate being fixed on a base and holding the fixed die;

a movable die plate holding the movable die and provided in the opening or closing direction on the base movably;

a tie bar having a piston and a coupled section;

a cylinder for mold clamping being equipped in either of the fixed die plate or the movable die plate and having a cylinder chamber accommodating the piston of the tie bar and at least two driving liquid supply ports supplying pressurized driving liquid for generating mold clamping force to the cylinder chamber;

a coupling section being equipped in the other of the fixed die plate or the movable die plate and enabling to unite or release for the coupled section of the tie bar;

a die plate position detection sensor for detecting a position of the movable die plate on the base;

a position detector for detecting a position of the tie bar in a moving direction of the tie bar;

a direction change valve coupled to each of the driving liquid supply ports for change a supply destination of the driving liquid between a first cylinder chamber and a second cylinder chamber zoned by the piston of the cylinder for mold clamping;

a sleeve coupled with the cavity;

a plunger tip inserted into the sleeve;

an injection cylinder driving the plunger tip; and a control unit for specifying a position of the tie bar where the coupling section and the coupled section are to be coupled based on the position of the movable die plate detected by the die plate position detection sensor, and controlling the tie bar at the specified position by controlling the direction change valve in response to the position of the tie bar detected by the position detector in a state where the movable die and the fixed die are contacted and a molding material is provided to the sleeve, wherein said specifying a position of the tie bar and said controlling the tie bar at the specified position is performed for every molding cycle.

7. A mold clamping method clamping a fixed die and a movable die on a base and providing:

a fixed die plate being fixed on the base and holding the fixed die, a movable die plate holding the movable die and provided in the opening or closing direction on the base movably, a tie bar having a piston and a coupled section, a cylinder for mold clamping being equipped in either of the fixed die plate or the movable die plate, having a cylinder chamber accommodating the piston of the tie bar and at least two driving liquid supply ports supplying pressurized driving liquid for generating mold clamping force to the cylinder chamber, a coupling section being equipped in the other of the fixed die plate or the movable die plate and enabling to unite or release for the coupled section of the tie bar, and a die plate position detection sensor for detecting a position of the movable die plate on the base, wherein a position of the tie bar where the coupling section and the coupled section are to be coupled is specified based on the position of the movable die detected by the die plate position detection sensor, the tie bar is moved by a supply of driving liquid to the cylinder for mold clamping, and the tie bar is positioned at the specified position in a state where the movable die and the fixed die are contacted and a molding material is provided to a sleeve coupled with a cavity formed by the fixed die and the movable die, wherein the position of the tie bar is specified and the tie bar is positioned at the specified position for every molding cycle, the coupled section of the positioned tie bar and the coupling section are coupled, and mold clamping force is generated by a supply of the driving liquid to the cylinder for mold clamping in a state where the coupled section and the coupling section are coupled.

* * * * *

UNITED STATES PATENT AND TRADEMARK OFFICE
CERTIFICATE OF CORRECTION

PATENT NO. : 7,288,221 B2  Page 1 of 1
APPLICATION NO. : 11/087771
DATED : October 30, 2007
INVENTOR(S) : Tsuji et al.

It is certified that error appears in the above-identified patent and that said Letters Patent is hereby corrected as shown below:

Title Page
(73) Assignee

"Toshiba Kakai Kabushiki Kaisha, Tokyo, Tokyo (JP)" should read --Toshiba Kikai Kabushiki Kaisha, Tokyo (JP)--

Signed and Sealed this

Eleventh Day of March, 2008

JON W. DUDAS
*Director of the United States Patent and Trademark Office*